Patented June 25, 1940

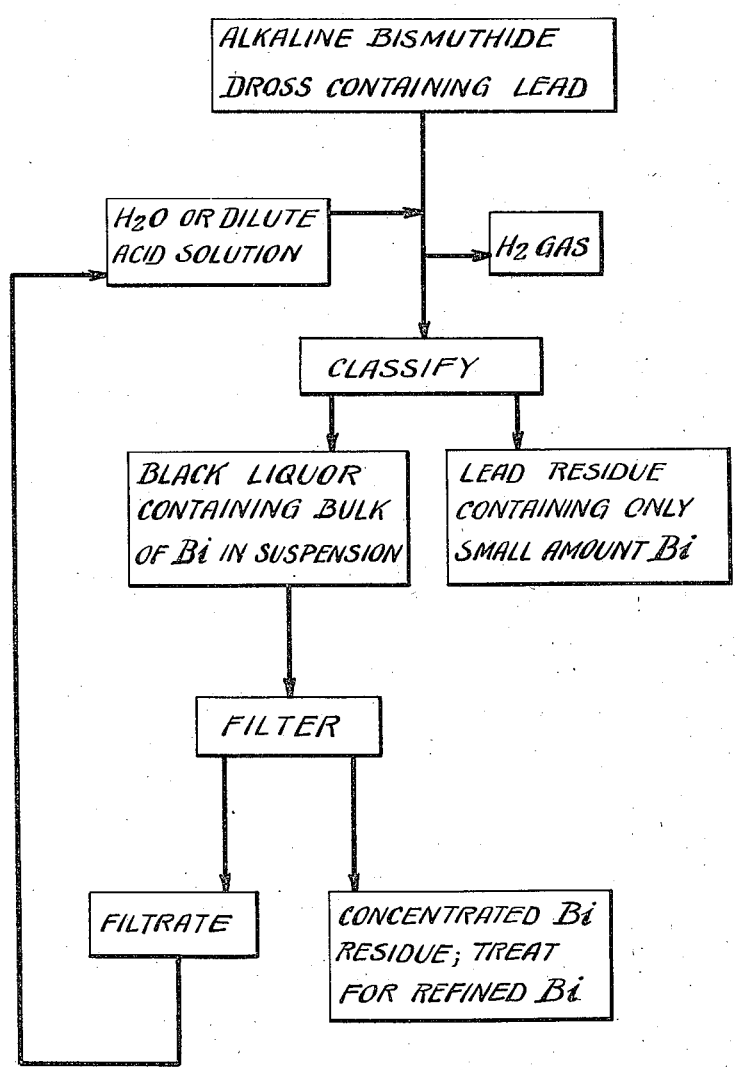

2,205,387

UNITED STATES PATENT OFFICE 2,205,387

RECOVERY OF BISMUTH

Jesse O. Betterton and Yurii E. Lebedeff, Metuchen, N. J., assignors to American Smelting and Refining Company, New York, N. Y., a corporation of New Jersey Application August 28, 1939, Serial No. 292,252

10 Claims. (Cl. 75—70)

This invention relates to the production of bismuth and particularly concerns certain improvements in the concentration and recovery of bismuth from bismuthide drosses.

It is well known that when a bismuth lead alloy is treated under proper conditions with appropriate alkali, alkaline earth, or rare earth metals, the bismuth is concentrated in what may be termed an alkaline bismuthide dross.

As shown in United States Letters Patent No. 1,989,734, granted February 5, 1935, to Jesse O. Betterton and Yurii E. Lebedeff, such a dross may be pressed, incorporated in a molten bath of alkali, alkaline earth fluorides and/or chlorides and liquated thereby materially lowering its lead content. The dross may then be leached with a solution of sulphuric acid to dissolve the alkali, alkaline earth salts and yield a bismuth lead residue suitable for smelting to crude bismuth metal and subsequent refining to pure bismuth.

While pressing and liquating will materially lower the lead content of an alkaline bismuthide dross, nevertheless, considerable lead will remain and as the bismuth to lead ratio of the dross is substantially unaffected by the leaching step as above described, all of the remaining lead must be removed by subsequent smelting or refining operation.

The present invention is based upon the discovery that when an alkaline bismuthide dross containing lead is reacted upon by water, the bismuth and lead are transformed into a state susceptible of ready classification. Actual operations have demonstrated that it is possible, by simple classification, to consistently obtain 90% or more of the total bismuth in one product containing only a fraction of the lead present in the dross prior to reacting the latter with water. By thus favorably altering the bismuth to lead ratio, the present invention constitutes a marked improvement in the art.

The invention is, of course, applicable to the treatment of practically any of the alkaline bismuthide drosses obtained by treating bismuth-lead alloys with appropriate alkali, alkaline earth, or rare earth metal debismuthizing reagents. However, for the best results, the bismuth content of the dross should be relatively high and care should be exercised to prevent oxidation of the dross prior to its treatment with water. A dross produced through the use of calcium and magnesium and which has been pressed and liquated as shown in the Patent No. 1,989,734 is well suited for treatment in accordance with the present invention.

In practising the invention, the alkaline bismuthide dross is reacted with water in a suitable vessel and agitated until completely decomposed. Assuming calcium and magnesium to be the reagents employed in forming the dross, its decomposition may be expressed by the following equations:

$$Ca_3Bi_2 + 6H_2O \rightarrow 3Ca(OH)_2 + 2Bi + 3H_2$$
$$Mg_3Bi_2 + 6H_2O \rightarrow 3Mg(OH)_2 + 2Bi + 3H_2$$

The elemental bismuth resulting from the reaction of the bismuthides in the dross with water imparts a black color to the liquid and is in such a finely-divided state as compared to the particles of lead that an efficient classification of the two metals can be effected. It has been found that such classification can be accomplished in many different manners as, for example, by ordinary screening or the use of such standard apparatus as the Callow cone, Hardinge drum classifier, Wilfley table and the like.

Following the separation of the black liquor containing the bismuth from the lead residue, the former is treated, preferably by filtration, to separate the bismuth from the liquid. The filtrate free from bismuth may be returned to treat further quantities of alkaline bismuthide dross and the bismuth residue processed for the recovery of pure bismuth. The lead residue may be returned to the process for concentration of its depleted bismuth content as alkaline bismuthide dross and subsequent treatment in accordance with the invention.

Instead of using just plain water in reacting upon the bismuthides, dilute acid solutions may be employed as neither the bismuth nor the lead will be substantially affected at the low temperatures normally employed. At the same time, however, the presence of the acid will accelerate the decomposition of the bismuthides, especially when treating low grade dross. Typical examples of acid that may be added to the water are sulphuric and hydrochloric which convert the alkaline content of the bismuthides into sulphates and chlorides, respectively.

The drawing accompanying and forming a part of this specification is a flow sheet illustrating the process of the invention.

That alkaline bismuthide-lead drosses are readily amenable to classification following reaction with water is amply evidenced by the following specific example.

In this instance 310 parts by weight of pressed and liquated bismuthide dross assaying 48.93% lead, 40.31% bismuth, 4.93% calcium and 5.43% magnesium was agitated with 150 volumes of water for four hours. Immediately thereafter the black liquor containing the bismuth was decanted from the heavier insolubles. The liquor was then filtered and the filter cake washed with water, there being produced 277 parts by weight of wet cake and 1315 volumes of filtrate containing 0.89 gm./l. calcium, 0.04 gm./l. lead, a trace of magnesium and no bismuth. The bismuth filter cake after drying for 16 hours at 105° C. was 180 parts by weight and had a bismuth to lead ratio of over 4:1 as compared to a ratio of 1.2:1 for the dross prior to its treatment in accordance with the invention.

It will be apparent that in its broader aspects the invention contemplates treating an alkaline bismuthide lead dross with an aqueous reactant which will convert the bismuth to elemental form and thereafter subjecting the products to a classifying operation by which a marked concentration of the bismuth is obtained. Obviously many details of operation may be varied within the scope of the invention as defined by the appended claims.

What is claimed is:

1. The process for treating an alkaline bismuthide-lead dross which comprises reacting same with water and classifying the resulting products according to bismuth and lead contents, respectively.

2. The process for recovering bismuth from an alkaline bismuthide dross which comprises decomposing the dross in the presence of water to yield finely-divided elemental bismuth in the form of a liquor containing practically the entire bismuth content of the original dross, subjecting the liquor and decomposition residue to a classifying operation to separate the liquor from at least the major part of the residue, and separating the bismuth from the liquid component of the liquor.

3. The process for recovering bismuth from an alkaline bismuthide dross which comprises decomposing the dross by reaction with a dilute acid solution to yield finely-divided elemental bismuth in the form of a liquor containing practically the entire bismuth content of the original dross, subjecting the liquor and decomposition residue to a classifying operation to separate the liquor from at least the major part of the residue, and separating the bismuth from the liquid component of the liquor.

4. The process for obtaining bismuth from a water-reactant alkaline bismuthide dross which comprises decomposing the dross with water to yield the bismuth in a finely-divided state and forming a liquor in which there is suspended substantially the entire bismuth content of said dross, separating the liquor from heavier water-insoluble decomposition residues, and recovering the bismuth from said liquor.

5. The process for recovering bismuth from bismuth-lead alloys which comprises concentrating the bismuth as a water-reactant alkaline bismuthide dross, decomposing said dross in the presence of water to convert the bismuth content thereof to finely-divided elemental bismuth, recovering said finely-divided elemental bismuth as a high-bismuth concentrate, and processing said concentrate for the production of pure bismuth.

6. In the recovery of bismuth from bismuth-lead alloys, the combination of steps comprising concentrating the bismuth as a water-reactant alkaline bismuthide-lead dross, effecting decomposition of said dross in the presence of water to liberate the bismuth and form same as a finely-divided suspension in said water, separating said suspension from at least the major portion of associated insoluble lead components thereby effecting a concentration of the bismuth, and recovering bismuth from said suspension.

7. The process for producing bismuth which comprises decomposing a quantity of alkaline bismuthide-lead dross in the presence of water, classifying the resultant material into a black liquor containing the bulk of the bismuth and a lead residue relatively low in bismuth, filtering said liquor, employing the filtrate in the decomposition of an additional quantity of dross, and processing the bismuth residue from the filtration step to yield refined bismuth.

8. The process for treating a bismuth-lead alloy which comprises treating said alloy with appropriate reagents from the alkali, alkaline earth and rare earth groups of metals to concentrate the bismuth in an alkaline bismuthide-lead dross, treating said dross in the presence of water to decompose the bismuthides and form a liquor containing the bismuth in finely-divided form, effecting a further concentration of bismuth by classification of the bismuth liquor from the lead residues, and separating the liquor from its bismuth content.

9. The process for obtaining bismuth from a bismuth-lead alloy which comprises effecting an initial concentration of the bismuth as an alkaline bismuthide-lead dross, effecting a further concentration of the bismuth by fusion of the dross with alkali, alkaline earth halides and liquation of the fused mass, effecting a still further concentration of the bismuth by reacting the salt residue containing the alkaline bismuthides with water and separating the bismuth-bearing liquor from the bulk of the lead present in the salt residue, and recovering bismuth from said liquor.

10. The process for recovering bismuth from drosses containing alkaline bismuthides which comprises reacting same with a dilute acid solution, and then mechanically classifying the reaction products to yield a high-bismuth concentrate.

JESSE O. BETTERTON.
YURII E. LEBEDEFF.